United States Patent [19]
Tang

[11] Patent Number: 5,395,625
[45] Date of Patent: Mar. 7, 1995

[54] FLUID TREATMENT TABLET

[75] Inventor: Nianfa Tang, Richmond Heights, Ohio

[73] Assignee: Jet, Inc., Cleveland, Ohio

[21] Appl. No.: 6,492

[22] Filed: Jan. 21, 1993

[51] Int. Cl.$^6$ .............................................. A61K 9/20
[52] U.S. Cl. ................... 424/464; 424/76.7; 424/76.8; 424/405; 424/661; 210/754; 252/94; 252/174; 252/175; 422/37
[58] Field of Search ................ 424/464, 76.1, 76.5, 424/76.7, 76.8, 405, 661

[56] References Cited

U.S. PATENT DOCUMENTS

| | | | |
|---|---|---|---|
| 3,595,786 | 7/1971 | Horvath et al. | 210/198 |
| 3,856,932 | 12/1974 | May | 424/16 |
| 4,584,106 | 4/1986 | Weld | 210/754 |
| 4,732,689 | 3/1988 | Harvey et al. | 210/754 |
| 4,759,907 | 7/1988 | Kawolics et al. | 422/7 |
| 4,816,177 | 3/1989 | Nelson et al. | 252/181 |
| 5,089,127 | 2/1992 | Junker et al. | 210/206 |

OTHER PUBLICATIONS

Sanuril Data Sheets and Brochures Dating from 1982 and 1983.
Aquaward Data Sheets and Brochures Dating From 1984 and 1989.
D-Chlor Data Sheets and Brochures Dating From 1986 and 1990.
Cook and Martin. Remington's Practice of Pharmacy, 1948 (First Edition 1889).
Stokes Catalog No. 816 (Oct. 1958).

*Primary Examiner*—Thurman K. Page
*Assistant Examiner*—James M. Spear
*Attorney, Agent, or Firm*—Jon L. Roberts; Thomas M. Champagne

[57] ABSTRACT

A shape for chlorination and dechlorination tablets which reduces pillaring and wicking effects during fluid treatment and offers a consistent dissolution rate during the chlorination or dechlorination process. The opposing surfaces of the stacked tablets are formed by a combination of concave and convex shapes. The shape of the opposing surfaces prevents the formation of a central pillar, resulting in the formation of a side pillar instead. During the formation of the side pillar, the fluid contact surface area of the tablets gradually increases to compensate for the diminishing periphery of the tablets. As a result, the dissolution rate of the tablet is kept substantially constant over the course of tablet dissolution. The shape of the opposing surfaces of the stacked tablets also only provides for minimum contact between adjacent tablets, slowing the moisture diffusion speed and minimizing wicking effects.

14 Claims, 3 Drawing Sheets 5,395,625

FLUID TREATMENT TABLET

BACKGROUND OF THE INVENTION

1. Field of the Invention

The present invention relates in general to a fluid treatment process and to the tablets used to effect such treatment. In particular, the present invention relates to a chlorination or dechlorination process in the potable water and wastewater treatment field, where the chlorination/dechlorination process is effected by placing stacked tablets of a chlorination or dechlorination agent in the flow path of the fluid to be treated. The tablets are formed in a shape that causes the dissolution rate of the tablets in the fluid to remain substantially constant during the water treatment period.

2. Background and Description of the Related Art

Chlorine tablets have been extensively applied in commercial or smaller private potable water and wastewater treatments plants, as have dechlorination tablets. The tablets are normally stacked in a tube or other feed device which extends into the water to be treated. The bottom tablets in the feed device are initially immersed in the water, while the upper stacked tablets remain out of the water. The water flows past the bottom tablets, gradually dissolving these tablets as the water is treated. When the bottom tablets have dissolved to the point at which they can no longer support the upper tablets, the remains of the bottom tablets collapse and the remaining tablets in the feed device advance toward the bottom of the feed device, submersing some of the upper tablets in the water. These submersed tablets are now the bottom tablets, and the cycle is repeated.

Water treatment processes utilizing stacked tablets in a tube shaped feeder device are well known. U.S. Pat. No. 4,816,177 to Nelson et al. discloses a tubular device for holding stacked tablets used for the treatment of water. U.S. Pat. No. 3,595,786 to Horvath et al., U.S. Pat. No. 4,732,689 to Harvey et al., and U.S. Pat. No. 4,759,907 to Kawolics et al. all disclose similar tablet feed devices.

Most stacked tablets used for fluid treatment are cylindrically shaped with flat opposing surfaces. Because of the flat opposing surfaces, the entire top surface area of any one tablet in the stack is always completely in contact with the entire bottom surface area of the tablet resting on top of it. This tablet shape in a stack of other similar tablets results in two phenomena adverse to uniform dissolution and distribution of chemicals in a fluid: pillaring and wicking.

When a tablet feeder which is loaded with stacked tablets is placed in the fluid to be treated, the fluid contact surface area of the bottom tablets is maximized. After a few hours of operation, the periphery material of the bottom tablets is dissolved into the treated fluid and the diameter of the bottom tablets gradually becomes smaller. The direction of tablet erosion is from the periphery of the tablet toward the center. Gradually, a central pillar which still supports the upper tablets is formed at the bottom of the tablet stack. While the upper tablets are held by the pillar, the fluid contact surface area of the smallest pillar may be only 30 to 45 percent of its initial surface area. The dissolution rate of the tablet is directly proportionate to its fluid contact surface area. The dissolution rate is therefore much lower during the pillaring period. It is therefore not reliable to set or adjust the goal dissolution rate based on initial tablet surface area. The actual dissolution rate will vary over the course of the fluid treatment, and the lower dissolution rate during the pillaring period may not meet design or discharge requirements for the treated water.

The contact surface between two flat-surfaced tablets is a surface which also offers a large area for moisture diffusion from the water line to the upper tablets. Gradually, a wicking problem is caused by moisture saturation. That is, water will saturate the portions of the bottom tablets which have not yet dissolved. Because of the large surface contact area between adjacent tablets, some of this saturated moisture will quickly diffuse into the upper tablets in a process known as a wicking effect. The effect of this diffusion is that the upper tablets will not be completely dry when they are eventually submersed in the water, and therefore will dissolve and break apart too rapidly. For a constant dissolution rate to be achieved, the wicking effect must be minimized by reducing the diffusion speed.

The tablets used with the feeder disclosed in U.S. Pat. No. 4,816,177 to Nelson et al. are of a round cylindrical shape with flat opposing surfaces. U.S. Pat. No. 3,856,932 to May also discloses round, cylindrical tablets for fluid treatment having flat opposing surfaces. May recognized that fluid treatment tablets must be modified in order to achieve the goal of a constant dissolution rate. Rather than change the shape of the tablet, however, May coated a portion of the surface of the tablet with a fluid impervious material in order to slow the initial dissolution rate. This solution slows dissolution but does nothing to prevent the pillaring or wicking effect in feeder tablet delivery.

SUMMARY OF THE INVENTION

The tablet design of the present invention features opposing tablet surfaces that are a combination of concave and convex shapes. The design of the tablet embodied in the present invention results in an increase in the available surface area of the tablets during the pillaring period and in a reduction in the moisture diffusion speed.

The convex portion of the opposing sides follows the circumference of the circular tablet. The contact surface between adjacent stacked tablets is now this circle defined by the peak of the convex surface. Thus, a much more limited contact surface in the form of a line is defined by the peaks of the two convex surfaces in contact with one another. This line contact surface is a small percentage of the contact surface area of tablets having flat contact surfaces. The reduction in contact surface area results in a proportional reduction in the moisture diffusion speed between bottom and upper tablets and therefore greatly minimizes the wicking problems present with conventional tablets.

The concave surface of the opposing sides is located toward the center of the circular face of the tablet. Because the concave portions of opposing sides of adjacent tablets face each other, a gap is formed between these tablets at the center. Thus, it is impossible for a pillar to form at the center of the tablet. Instead, the pillar is formed at one side of the periphery. As the pillar is formed, the concave surfaces come into contact with the treated fluid. This extra fluid contact surface area compensates for surface area lost due to pillaring, and helps keep the dissolution rate constant. The side pillar is eventually washed out by the force of the water. Before the pillar is completely washed out of the stack, the upper tablet in the stack that is next in line to be submersed is tilted due to the supporting pillar's location at the periphery of the circularly shaped tablet. Part of this upper tablet therefore contacts the water prior to submersion, increasing the total tablet fluid contact surface to compensate for the fluid contact surface lost due to pillaring. This compensation helps keep the overall dissolution rate substantially constant over the course of the fluid treatment.

It is therefore an object of the present invention to provide a fluid treatment tablet which avoids the central pillaring problem common to fluid treatment systems of this type using flat surfaced tablets.

It is another object of the present invention to provide a fluid treatment tablet which maintains a consistent fluid contact surface area during the pillaring period.

It is a further object of the present invention to minimize the contact surface area between two adjacent fluid treatment tablets.

It is another object of this invention to reduce the moisture diffusion speed between adjacent fluid treatment tablets and therefore to reduce the wicking effect on the upper tablets.

It is an additional object of the present invention to provide a fluid treatment tablet, the shape of which helps reduce wicking effects.

It is also an object of the present invention to provide a fluid treatment tablet, the shape of which helps maintain a consistent tablet dissolution rate.

It is a further object of the present invention to provide a fluid treatment tablet having a smooth periphery edge.

These and other objects and advantages of the present invention, as set forth in the drawings, detailed description, and appended claims, will be apparent to those skilled in the art.

DETAILED DESCRIPTION OF THE INVENTION

Figure 1:
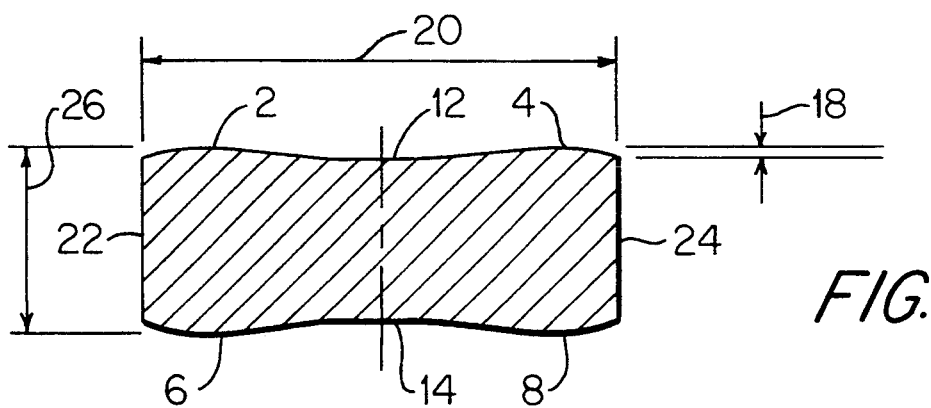
FIG. 1 shows a cross-section view of the tablet.
Figure 2:
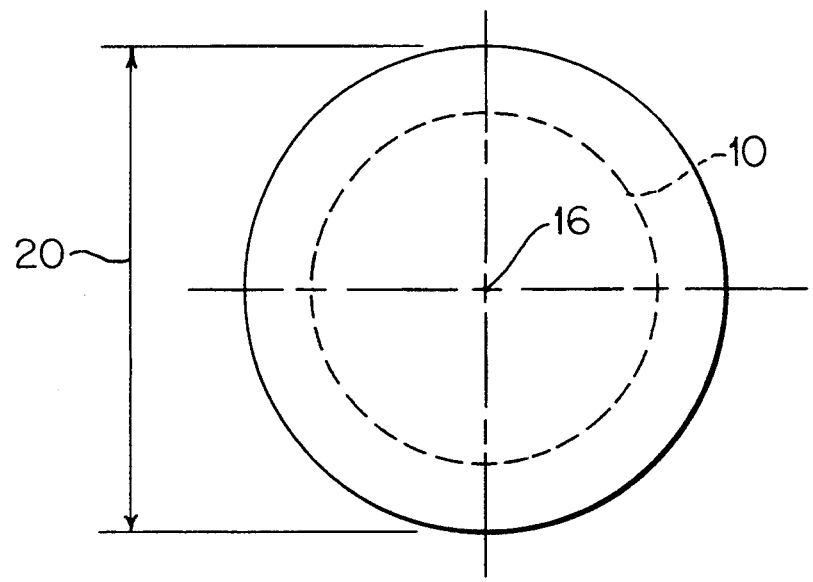
FIG. 2 shows a plan view of the tablet.

FIG. 1 shows a cross section of the tablet of the present invention and FIG. 2 shows a plan view of the tablet. The tablet as shown is generally of a circular disk shape. This is the preferred embodiment; alternate embodiments of the tablet may be of a generally cylindrical shape with, for example, a square or hexagonal cross-section. In general, a more fluid dynamic shape having smooth periphery edges will have better constant dissolution properties than a shape with corners and sharp edges. For this reason, a circular shape is preferred overall, and an oval shape would be preferred to, for example, a square shape or other polygon cross-section.

The top and bottom surfaces of the tablet have shapes composed of convex and concave components. The convex surfaces 2, 4, 6, and 8 are shown in cross-section in FIG. 1. As shown in FIG. 2, the peak of the convex surface on each top and bottom surface forms a circular peak surface 10. In the preferred embodiment, this circular peak surface 10 follows the circumference of the tablet. In alternate embodiments in which the tablet is not round, the peak surface 10 follows the periphery of the tablet. The concave surfaces 12 and 14 can also be seen in cross-section in FIG. 1. The lowest point, or apex, of each concave surface 12 and 14 lies in the center 16 of the circular shape of the tablet. The juxtaposition of convex and concave surfaces on the top and bottom surfaces of the tablet results in a height difference 18 between the circular peak surface 10 and the center 16. This height difference 18 forms a gap when the tablets are stacked. The tablets will be stacked in a feed device that is tube shaped and has an interior diameter that is large enough to accommodate the tablet diameter 20. The sides 22 and 24 of the tablet will line up with the sides of the feed device.

In the preferred embodiment, the tablet diameter 20 is approximately 2⅝ inches, and the height difference 18 between the circular peak surface 10 and the center 16 is approximately 1/16 of an inch. Thus, when tablets constructed according to the preferred embodiment are stacked, the centers of adjacent stacked tablets will be separated by a gap of approximately ⅛ of an inch. The preferred thickness 26 of the tablet is approximately one inch, measured between the top and bottom circular peak surfaces 10. Of course, tablets of different sizes may be used in practicing the present invention.

Figure 3:
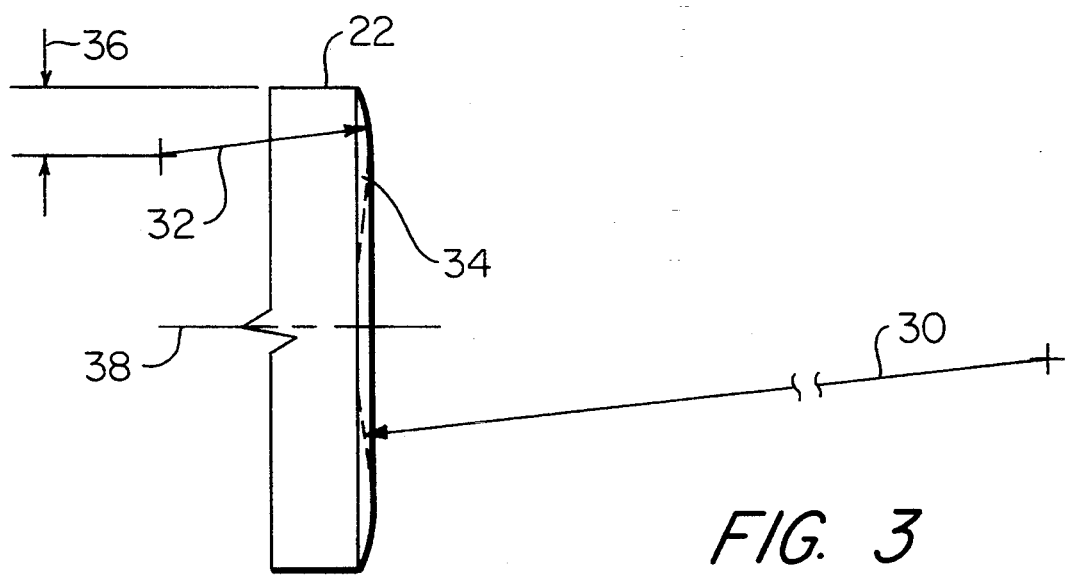
FIG. 3 shows the geometric design of the tablet surface.

As seen in FIGS. 1 and 3, the transition from the convex surface to the concave surface is made smoothly. The concave surface of the preferred embodiment is an arcuate surface of spherical concavity having a constant radius of curvature 30. Likewise, the convex surface of the preferred embodiment is an arcuate surface of circular convexity having a constant radius of curvature 32. Individual convex circular arcs align with the continuous radii of the circular tablet, resulting in the convex arcuate surface, which follows the tablet circumference. The arcs describing the concave surface and the convex surface meet at an inflection point 34.

In the preferred embodiment, the radius of curvature 30 of the concave surface is approximately six inches, drawn from a vertex centered on the longitudinal axis 38 of the tablet. The radius of curvature 32 of the convex surface is approximately 1 9/64 inches, drawn from a vertex centered on a line that is parallel to the longitudinal axis 38 of the tablet and located at a distance 36 of approximately ⅜ of an inch from the side of the tablet 22.

Other convex and concave radii of curvature are contemplated for use with the present invention as well. In addition, non-rounded shapes may be used for the concave and convex surfaces. The surface shapes may be triangular, rhomboid, or any other shape desired, as long as line contact (or at least minimum contact) is maintained along the top and bottom peak surfaces 10 of adjacent stacked tablets, and as long as a central gap is created such that the centers of adjacent tablets in a stack cannot touch in order to form a central pillar. The concave and convex shapes used on the top surface of the tablet may be different than those used on the bottom surface of the tablet.

Figure 4:
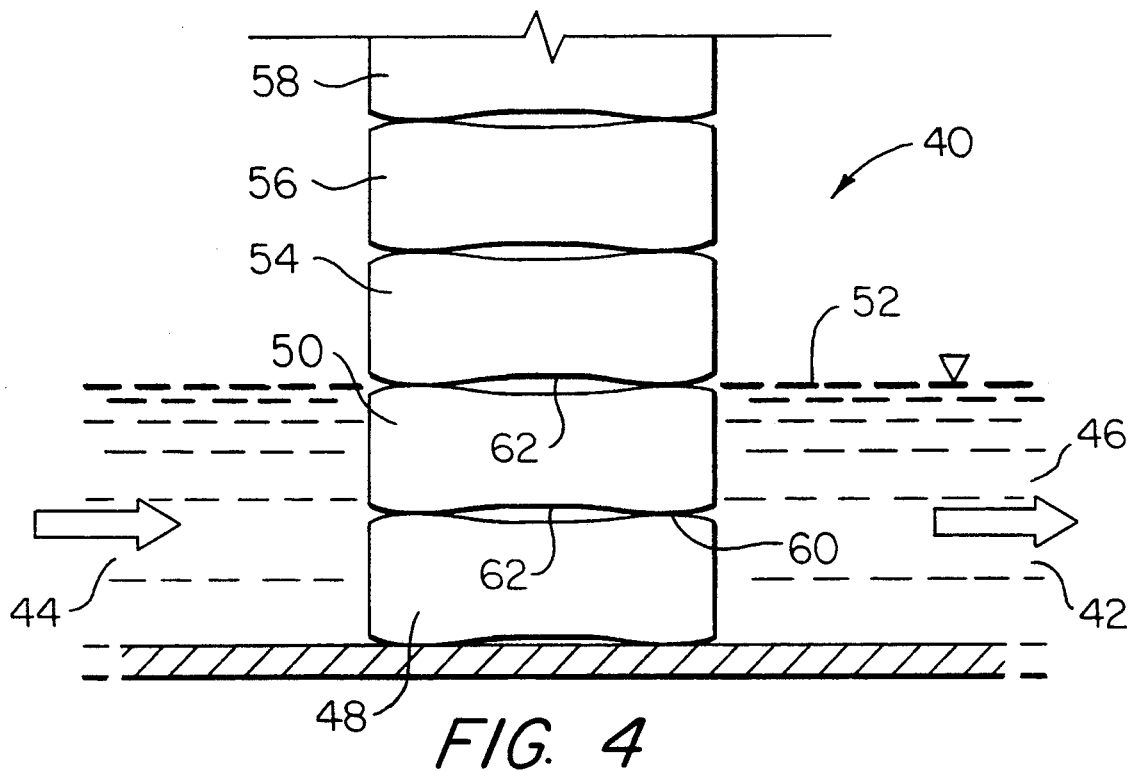
FIG. 4 shows a cross-section view of newly loaded tablets in a feeder.

The stacked tablets 40 are shown in FIGS. 4 through 7. In all of these figures, the tablets 40 are shown as they would look while stacked in a tubular feed device, but the feed device itself is not shown. FIG. 4 shows the stacked tablets 40 immediately after they are placed in the fluid 42. Arrows 44 and 46 show the fluid flow direction. In this example, two bottom tablets 48 and 50 are initially immersed in the fluid 42, while upper tablets 54, 56, and 58 remain above the fluid surface 52. The tablets rest upon each other at contact points 60. These contact points 60 are formed where the circular peak surfaces 10 of adjacent tablets meet. Stacking of the tablets forms central gaps 62 which have no contact with the fluid at the onset of fluid treatment. At this point in time, the fluid contact surface area provided by the bottom tablets 48 and 50 is restricted to the periphery of these tablets, that is, the surface area of the tablets outside the tablet contact points 60.

The central gaps 62 have significance for two reasons. First, the central gaps 62 prevent the formation of central pillars, and therefore eradicate the central pillaring problem. Second, the presence of the central gaps 62 leaves only the circular peak surfaces 10 as line contact points between adjacent tablets. Because the circular peak surfaces 10 form such a small percentage of the opposing surfaces of adjacent tablets, the diffusion speed between adjacent tablets of the present invention is proportionately slower than in tablets in which the opposing surfaces have complete contact, that is, tablets with flat opposing surfaces. The wicking effect is therefore substantially curtailed.

Figure 5:
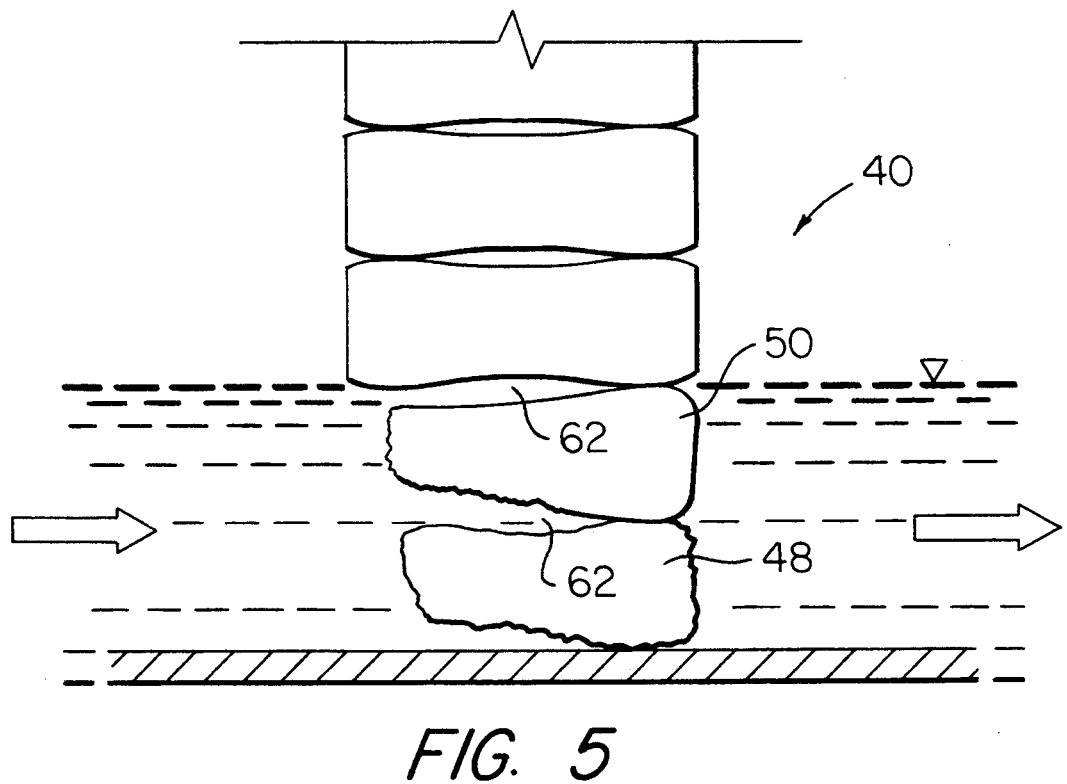
FIG. 5 shows a cross-section view of side pillaring effects.

FIG. 5 shows the stacked tablets 40 after the pillaring period has begun. As shown, the upstream side of the tablets have dissolved at a greater rate than the downstream side, and therefore a pillar has formed on the downstream side. Due to the diminishing size of the bottom tablets 48 and 50, the fluid contact surface area of the periphery of these tablets has diminished. However, due to the dissolution of the upstream side of the bottom tablets 48 and 50, the between-tablet central gaps 62 are now exposed to the fluid, adding to the total fluid surface contact area and keeping the dissolution rate substantially constant.

Figure 6:
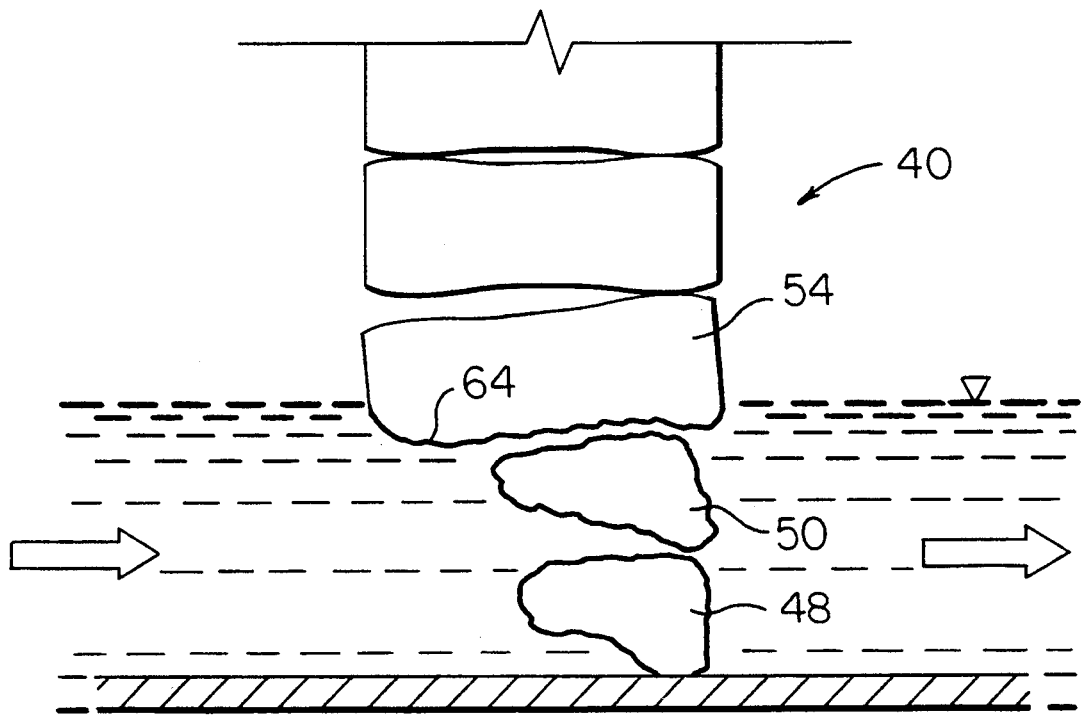
FIG. 6 shows a cross-section view of side pillaring effects occurring later in time.

FIG. 6 shows the stacked tablets 40 after substantial dissolution has taken place. Bottom tablets 48 and 50 have dissolved to the point where they can no longer fully support the lowest upper tablet 54. As a result, this upper tablet 54 tips slightly to one side due to the weight of the stack so that a portion of its bottom side 64 is immersed in the fluid. This portion of the bottom side 64 of upper tablet 54 adds to the total fluid contact surface area, compensating for the lost fluid contact surface area of the much smaller bottom tablets 48 and 50. As a result, the overall dissolution rate remains substantially constant.

Eventually, bottom tablets 48 and 50 dissolve to the point where they can no longer support the rest of the tablets in the stack. The bottom tablets 48 and 50 are then washed away by the fluid flow, or tablet residuals are crushed by the weight of the stack. Tablets remaining in the feed device advance toward the fluid. Two upper tablets 54 and 56 become the bottom tablets, as shown in FIG. 7, and the cycle is repeated.

Figure 7:
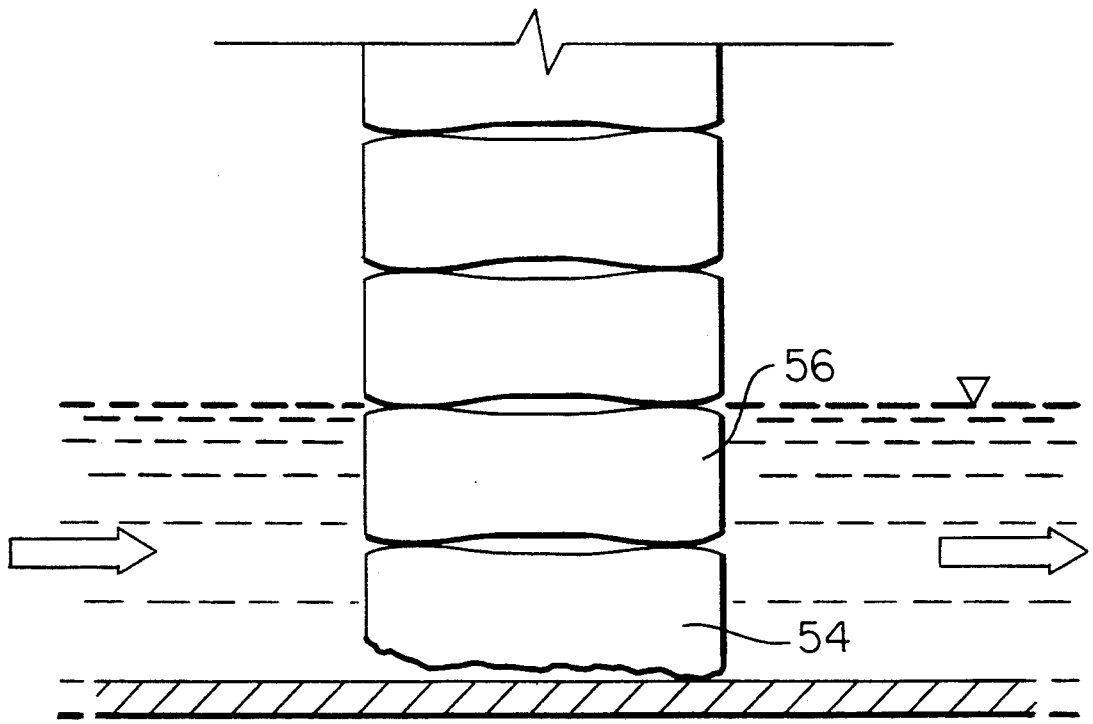
FIG. 7 shows a cross-section view of a tablet stack after the side pillar is washed out.

It must be noted that FIGS. 4 through 7 only represent four discrete steps in the continuous process that actually takes place. Over the course of the dissolution process from FIG. 4 to FIG. 5, the peripheral fluid contact surface of the bottom tablets 48 and 50 gradually decreases and the contact surface of the gaps 62 is gradually added to the total fluid surface area, keeping the dissolution rate substantially constant over that entire length of time. Likewise, between the scenarios depicted by FIGS. 5 and 6, upper tablet 54 gradually tips into the fluid as bottom tablets 48 and 50 gradually dissolve further. Again, the dissolution rate is kept substantially constant over this period of time until the stack advances, as shown in FIG. 7.

In the preferred embodiment described, both the top and bottom surfaces of each tablet have shapes composed of convex and concave components. A tablet in which only the top surface or the bottom surface has such a shape, the other surface being flat, would also have better dissolution properties than a tablet in which both top and bottom surfaces are flat. As long as the tablets are stacked such that the flat surfaces are always facing up or facing down, a flat tablet surface will always be in contact with a convex/concave surface. A central gap, albeit a smaller one, will therefore exist between tablets, and surface contact between adjacent tablets is still reduced. Therefore, a tablet which has such a combination of surfaces is an improvement over the state of the art. However, tablets having both top and bottom surfaces with shapes composed of convex and concave components provide larger central gaps, a smaller surface contact area, and a smoother periphery surface; this tablet, therefore, represents the preferred embodiment.

Preferred and alternative embodiments of the present invention have now been described in detail. Various other modifications will be apparent to and can be readily made by those skilled in the art without departing from the scope and spirit of this invention. For example, although the present invention is directed toward tablets which effect the chlorination or dechlorination of water, the invention is intended to encompass any tablets used in a fluid treatment process, and would be advantageous for any such purpose. Accordingly, it is not intended that the scope of the claims appended hereto be limited to the description as set forth herein, but rather than the claims be construed as encompassing all the features of patentable novelty that reside in the present invention, including all features that would be treated as equivalents thereof by those skilled in the art to which this invention pertains.

What is claimed is:

1. A non-ingestible physically structured fluid treatment tablet for industrial use, comprising:
   a) material for treating fluid, formed into a cylindrical shape;
   b) the cylindrical shape having a top surface and a bottom surface;
   c) the top surface having concave and convex components, a center point, and a periphery;
   d) the convex component of the top surface following the periphery of the tablet; and
   e) the material for treating fluid being selected from the group of materials consisting of chlorination agents and dechlorination agents.

2. The fluid treatment tablet of claim 1, wherein:
   a) the bottom surface has concave and convex components, a center point, and a periphery; and
   b) the convex component of the bottom surface follows the periphery of the tablet.

3. The fluid treatment tablet of claim 1, wherein the concave component of the top surface has an apex at the center point of the top surface of the tablet.

4. The fluid treatment tablet of claim 2, wherein the concave component of the top surface has an apex at the center point of the top surface of the tablet and the concave component of the bottom surface has an apex at the center point of the bottom surface of the tablet.

5. The fluid treatment tablet of claim 2, wherein the convex component of the top surface of a first tablet is in direct contact with the convex component of the bottom surface of a second tablet when the second tablet is stacked on the first tablet.

6. The fluid treatment tablet of claim 2, wherein a gap is formed by the concave component of the top surface of the first tablet and the concave component of the bottom surface of the second tablet when the second tablet is stacked on the first tablet.

7. The fluid treatment tablet of claim 1, wherein the material for treating fluid is formed into a circular disk shape.

8. The fluid treatment tablet of claim 1, wherein the material for treating fluid is formed into an ovular disk shape.

9. The fluid treatment tablet of claim 1, wherein the concave and convex components of the top surface are circularly arcuate.

10. The fluid treatment tablet of claim 9, wherein the concave and convex components of the top surface meet at a smooth inflection point.

11. The fluid treatment tablet of claim 2, wherein the concave and convex components of the bottom surface are circularly arcuate.

12. The fluid treatment tablet of claim 11, wherein the concave and convex components of the bottom surface meet at a smooth inflection point.

13. A non-ingestible physically structured fluid treatment tablet for industrial use, comprising:
   a) material for treating fluid, formed into a cylindrical shape;
   b) the cylindrical shape having a top surface and a bottom surface;
   c) the top surface having concave and convex components, a center point, and a periphery;
   d) the bottom surface having concave and convex components, a center point, and a periphery;
   e) the convex component of the top surface following the periphery of the tablet;
   f) the convex component of the bottom surface following the periphery of the tablet;
   g) the concave component of the top surface having an apex at the center point of the top surface of the tablet;
   h) the concave component of the bottom surface having an apex at the center point of the bottom surface of the tablet;
   i) the convex component of the top surface of a first tablet being in direct contact with the convex component of the bottom surface of a second tablet when the second tablet is stacked on the first tablet;
   j) a gap being formed by the concave component of the top surface of the first tablet and the concave component of the bottom surface of the second tablet when the second tablet is stacked on the first tablet; and
   k) the material for treating fluid being selected from the group of materials consisting of chlorination agents and dechlorination agents.

14. A non-ingestible physically structured fluid treatment tablet for industrial use, comprising:
   a) material for treating fluid, formed into a circular disk shape;
   b) the circular disk shape having a top surface, a bottom surface, and a circumference;
   c) the top surface having circular arcuate concave and convex components and a center point;
   d) the bottom surface having circular arcuate concave and convex components and a center point;
   e) the convex component of the top surface following the circumference of the tablet;
   f) the convex component of the bottom surface following the circumference of the tablet;
   g) the concave component of the top surface having an apex at the center point of the top surface of the tablet;
   h) the concave component of the bottom surface having an apex at the center point of the bottom surface of the tablet;
   i) the convex component of the top surface of a first tablet being in direct line contact with the convex component of the bottom surface of a second tablet when the second tablet is stacked on the first tablet;
   j) a gap being formed by the concave component of the top surface of the first tablet and the concave component of the bottom surface of the second tablet when the second tablet is stacked on the first tablet; and
   k) the material for treating fluid being selected from the group of materials consisting of chlorination agents and dechlorination agents.

* * * * *